United States Patent
Rhee et al.

(10) Patent No.: US 8,732,733 B2
(45) Date of Patent: May 20, 2014

(54) OPTICAL DISC DRIVING DEVICE HAVING SHAFT UPWARDLY PROTRUDING FROM CHUCKING MECHANISM

(71) Applicant: Samsung Electro-Mechanics Co., Ltd., Suwon (KR)

(72) Inventors: Dong Woo Rhee, Suwon (KR); Dong Yeon Shin, Suwon (KR); Kyung Seob Shin, Suwon (KR); Sang Kyu Lee, Suwon (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 13/687,357

(22) Filed: Nov. 28, 2012

(65) Prior Publication Data

US 2014/0082642 A1    Mar. 20, 2014

(30) Foreign Application Priority Data

Sep. 14, 2012  (KR) .................. 10-2012-0102150

(51) Int. Cl.
*G11B 33/08*    (2006.01)

(52) U.S. Cl.
USPC .......................................... 720/698

(58) Field of Classification Search
USPC .................. 720/600, 601, 658, 695–717
See application file for complete search history.

(56) References Cited

U.S. PATENT DOCUMENTS

| | | | | |
|---|---|---|---|---|
| 5,457,676 A | * | 10/1995 | Park | 720/710 |
| 6,252,843 B1 | * | 6/2001 | Begley et al. | 720/708 |
| 6,577,587 B1 | * | 6/2003 | Kishibe et al. | 720/700 |
| 2011/0265106 A1 | * | 10/2011 | Smirnov et al. | 720/695 |

FOREIGN PATENT DOCUMENTS

| | | |
|---|---|---|
| KR | 2001-0005314 | 1/2001 |
| KR | 10-2011-0023228 | 3/2011 |
| KR | 10-2011-0095613 | 8/2011 |
| KR | 10-2012-0062347 | 6/2012 |
| KR | 10-2012-0067663 | 6/2012 |

OTHER PUBLICATIONS

Korean Office Action issued Oct. 4, 2013 in corresponding Korean Patent Application No. 10-2012-0102150.

* cited by examiner

*Primary Examiner* — Nathan Danielsen

(57) ABSTRACT

There is provided an optical disc driving device including: a sleeve holder fixed to a base member; a sleeve fixed to the sleeve holder; a shaft rotating while being inserted into the sleeve; a rotor hub fixed to the shaft and rotating together with the shaft; a chucking mechanism fixed to the rotor hub and having a disc mounted thereon; and an upper case forming an internal space, together with the base member, wherein the shaft is protruded upwardly from the chucking mechanism.

8 Claims, 5 Drawing Sheets

_US 8,732,733 B2_

OPTICAL DISC DRIVING DEVICE HAVING SHAFT UPWARDLY PROTRUDING FROM CHUCKING MECHANISM

CROSS-REFERENCE TO RELATED APPLICATIONS

This application claims the priority of Korean Patent Application No. 10-2012-0102150 filed on Sep. 14, 2012, in the Korean Intellectual Property Office, the disclosure of which is incorporated herein by reference.

BACKGROUND OF THE INVENTION

1. Field of the Invention

The present invention relates to an optical disc driving device.

2. Description of the Related Art

Generally, a spindle motor installed in an optical disc drive serves to rotate a disc to enable an optical pick-up device to read data recorded on the disc.

Recently, as disc recording capacities have increased, a data track pitch of a disc is reduced. As a result, it is necessary to reduce a vertical displacement of a disc at the time of a rotation thereof.

Further, a disc recognition/detection error may occur due to contact between the disc and an upper case at the time of an external impact, as a thickness of a notebook computer in which an optical disc driver is mounted is reduced.

Consequently, it is required to develop a structure capable of reducing the occurrence of a recognition/detection error of a disc due to contact between the disc and the upper case while suppressing a rotor of a spindle motor from overfloating and reducing the occurrence of vibrations due to various factors.

RELATED ART DOCUMENT (Patent Document 1) Korean Patent Laid-Open Publication No. 2012-0062347

SUMMARY OF THE INVENTION

An aspect of the present invention provides an optical disc driving device capable of reducing signal detection and disc recognition errors from a disc.

According to an aspect of the present invention, there is provided an optical disc driving device, including: a sleeve holder fixed to a base member; a sleeve fixed to the sleeve holder; a shaft rotating while being inserted into the sleeve; a rotor hub fixed to the shaft and rotating together with the shaft; a chucking mechanism fixed to the rotor hub and having a disc mounted thereon; and an upper case forming an internal space, together with the base member, wherein the shaft is protruded upwardly from the chucking mechanism.

The optical disc driving device may further include a spring member mounted on an indside of the upper case to be disposed above the shaft.

The spring member may be configured as one of a coil spring and a leaf spring.

The shaft and the spring member may be disposed to have a predetermined distance therebetween.

The optical disc driving device may further include a plate-shaped damper member mounted on an inside of the upper case to be disposed above the shaft and formed of an elastic material.

The optical disc driving device may further include a stopper member mounted on the base member to prevent the shaft from overfloating, wherein a bottom portion of the shaft may be provided with an insertion groove into which the stopper member is inserted.

The shaft may be formed of a material having a higher strength than that of the upper case to prevent the shaft from being deformed when the shaft contacts the upper case due to an external impact.

The optical disc driving device may further include a stator core mounted on an outer circumferential surface of the sleeve holder, and a pulling magnet mounted on the stator core facing the rotor hub.

According to another aspect of the present invention, there is provided an optical disc driving device, including: a sleeve holder fixed to a base member; a sleeve fixed to the sleeve holder; a shaft rotating while being inserted into the sleeve; a rotor hub fixed to the shaft and rotating together with the shaft; a chucking mechanism fixed to the rotor hub and having a disc mounted thereon; a stator core mounted on an outer circumferential surface of the sleeve holder to be disposed below the rotor hub; a pulling magnet mounted on the stator core to face the rotor hub; a stopper member mounted on the base member to prevent the shaft from overfloating; and an upper case forming an internal space, together with the base member, wherein the shaft is protruded upwardly from the chucking mechanism, and a bottom portion of the shaft is provided with an insertion groove into which the stopper member is inserted.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
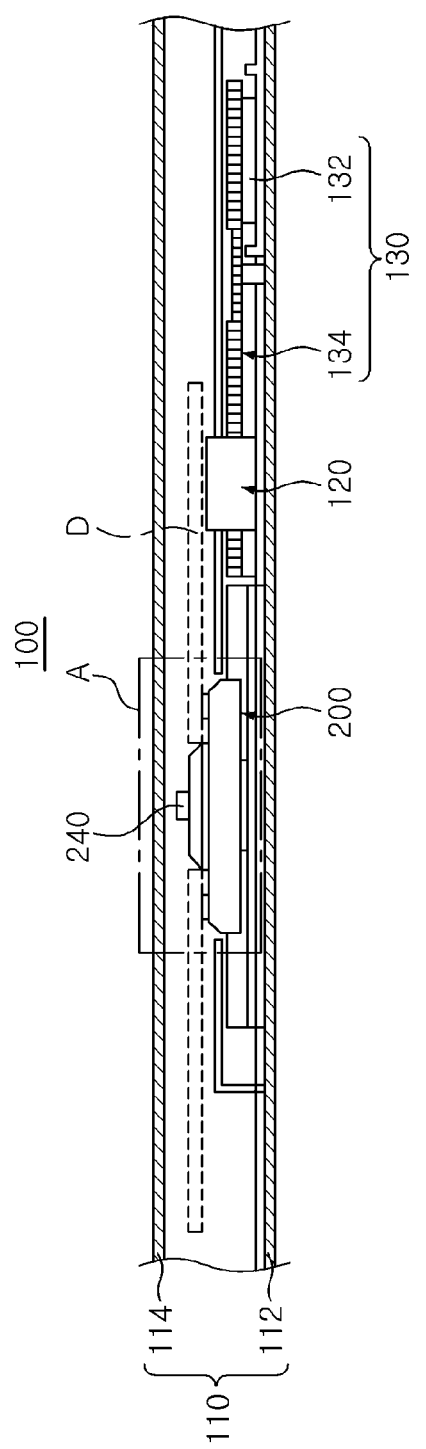
FIG. 1 is a schematic cross-sectional view illustrating an optical disc driving device according to an embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions of components may be exaggerated for clarity, and the same reference numerals will be used throughout to designate the same or like components.

Figure 2:
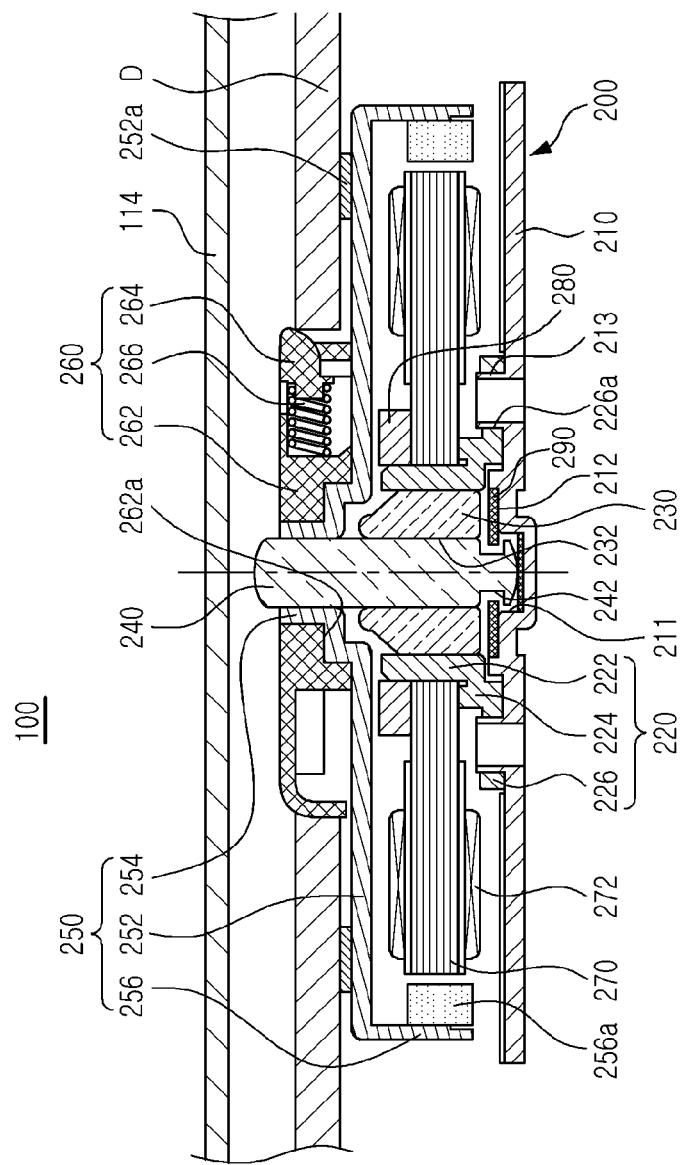
FIG. 2 is an enlarged cross-sectional view illustrating portion A of FIG. 1.
Figure 3:
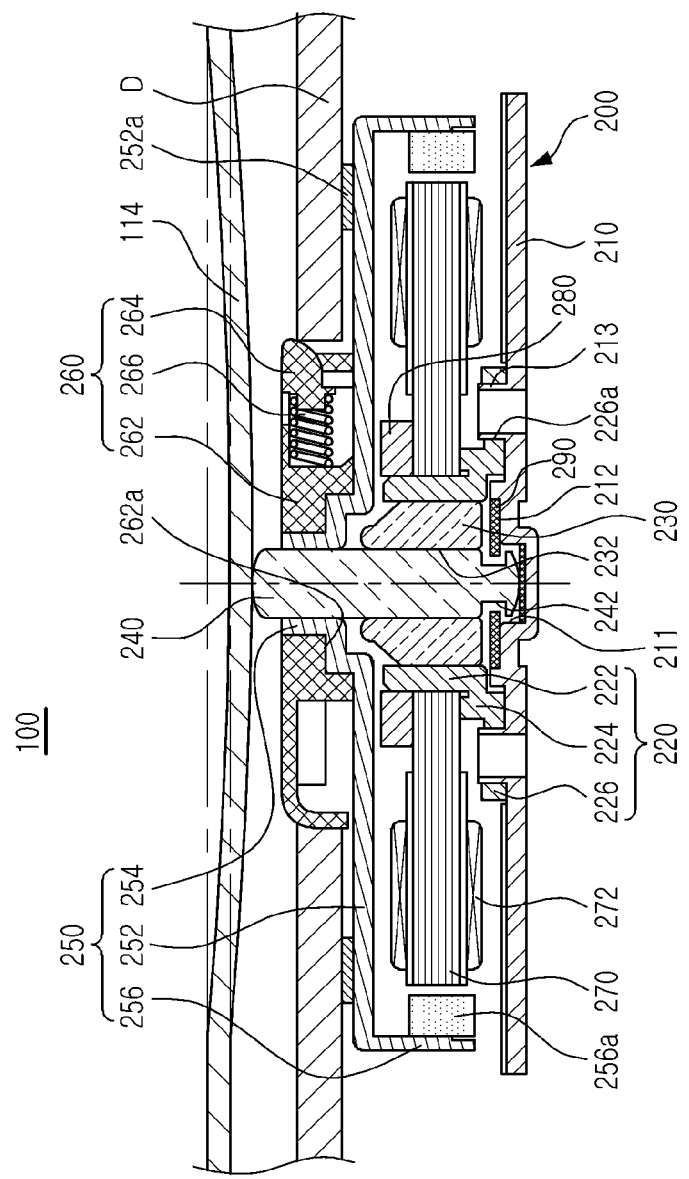
FIG. 3 is a view illustrating an operation of the optical disc driving device according to the embodiment of the present invention.

FIG. 1 is a schematic cross-sectional view illustrating an optical disc driving device according to an embodiment of the present invention, FIG. 2 is an enlarged cross-sectional view illustrating portion A of FIG. 1, and FIG. 3 is a view illustrating an operation of the optical disc driving device according to the embodiment of the present invention.

Referring to FIGS. 1 and 3, an optical disc driving device 100 according to an embodiment of the present invention may include, for example, a housing 110 configured of a lower case 112 and an upper case 114, an optical pick-up unit 120, a driving unit 130, and a spindle motor 200.

The housing 110 is provided with an aperture (not shown) through which a disc enters and exits and the housing 110 is formed to have an internal space in which the spindle motor 200, the optical pick-up unit 120, and the driving unit 130 may be installed. That is, the lower case 112 and the upper case 114 are assembled to form the internal space.

The optical pick-up unit 120 irradiates light onto a disc D rotated by the spindle motor 200 and receives light reflected therefrom. That is, the optical pick-up unit 120 may be mounted in the housing 110 to be disposed below the disc D, thereby implementing a light scribe function of printing characters, drawings, and the like on the disc D and a function of reading the characters, the drawings, and the like printed on the disc D.

The driving unit 130 is connected to the optical pick-up unit 120 to move the optical pick-up unit 120 in a circumferential direction of the disc D. Further, the driving unit 130 transfers driving force generated from an optical pick-up driving motor 132 to the optical pick-up unit 120 through a power transfer member 134, such that the optical pick-up unit 120 irradiates light onto the disc D and receives the light reflected therefrom while moving in the circumferential direction of the disc D.

Meanwhile, the spindle motor 200 will be described in more detail with reference to FIGS. 2 and 3.

The spindle motor 200 may include, for example, a base member 210, a sleeve holder 220, a sleeve 230, a shaft 240, a rotor hub 250, a chucking mechanism 260, a stator core 270, a pulling magnet 280, and a stopper member 290.

Here, terms with respect to directions will first be defined. With regard to FIG. 2, an axial direction refers to a vertical direction, that is, a direction from a bottom portion of the shaft 240 toward an top portion thereof or a direction from the top portion of the shaft 240 toward the bottom portion thereof, while a radial direction refers to a horizontal direction, that is, a direction from the shaft 240 toward an outer circumferential surface of the rotor hub 250 or from the outer circumferential surface of the rotor hub 250 toward the shaft 240.

Further, a circumferential direction refers to a direction along an outer circumferential surface of the shaft 240 or the outer circumferential surface of the rotor hub 250.

The base member 210 may be provided with a shaft groove 211 into which the bottom portion of the shaft 240 is inserted. Further, the base member 210 may be disposed outside of the shaft groove 211 to form a stopper member support part 212 in which the stopper member 290 is seated.

Further, the base member 210 may be provided with a protrusion 213 for fixing the sleeve holder 220. The plurality of protrusions 213 may be disposed to have a predetermined distance therebetween in the circumferential direction.

The sleeve holder 220 may be fixed to the base member 210 as described above. Meanwhile, according to the present embodiment, the sleeve holder 220 is installed in the base member 210 through the protrusions 213, but the present invention is not limited thereto. Therefore, the sleeve holder 220 may be fixed to the base member 210 by an adhesive or cogging.

Further, the sleeve holder 220 may include a holder body 222 into which the sleeve 230 is inserted and having a cylindrical shape, a stator core mounting part 224 extending from the holder body 222 and having the stator core 270 mounted on a top surface thereof, and an extension part 226 extending from the stator core mounting part 224 in the radial direction and contacting a top surface of the base member 210.

Further, the extension part 226 may be provided with a communicating hole 226a into which the protrusion 213 is inserted.

The sleeve 230 is fixed to the sleeve holder 220. That is, the sleeve 230 may be provided with the sleeve holder 220 to be disposed inside the holder body 222.

Further, the sleeve 230 may be provided with a shaft hole 232 so that the shaft 240 may be inserted thereinto. That is, the sleeve 230 may be provided with the shaft hole 232 into which the shaft 240 is inserted to rotatably support the shaft 240.

The shaft 240 is rotated while being inserted into the sleeve 230. Further, the bottom portion of the shaft 240 may be provided with an insertion groove 242 into which the stopper member 290 is inserted. A length of the insertion groove 242 in the axial direction may be formed to be larger than a thickness of the stopper member 290 and the shaft 240 may not primarily overfloat at the time of an external impact due to the stopper member 290.

Meanwhile, the shaft 240 may be protruded upwardly from the chucking mechanism 260. Therefore, a top surface of the shaft 240 contacts the upper case 114 at the time of an external impact to prevent the upper case 114 from contacting the disc D.

Described in more detail, a distance between the disc D and the upper case 114 is shorter due to the thinness of the optical disc driving device 100. However, the upper case 114 may be deformed at the time of an external impact, as illustrated in FIG. 3.

As such, when the upper case 114 is deformed, the upper case 114 may contact the disc D if the shaft 240 is not protruded upwardly from the chucking mechanism 260.

Therefore, the disc D may be deformed or warped while being mounted on the chucking mechanism 260.

However, as described above, in the case in which the shaft 240 is protruded upwardly from the chucking mechanism 260, the upper case 114 contacts the shaft 240 first, even when the upper case 114 is deformed due to an external impact, whereby the upper case 114 may be prevented from contacting the disc D.

In addition, when an external impact is applied thereto, overfloating of the shaft 240 may be reduced. That is, the overfloating of the shaft 240 is primarily prevented by the stopper member 290, but the shaft 240 may overfloat when an external impact greater than resistance force generated due to the stopper member 290 is applied thereto.

However, the shaft 240 is protruded upwardly from the chucking mechanism 260 and thus, the shaft 240 contacts the upper case 114 even when the external impact greater than the resistance force due to the stopper member 290 is applied, whereby the overfloating of the shaft 240 may be prevented.

In order to prevent the shaft 240 from being deformed when the shaft 240 contacts the upper case 114 due to an external impact, the shaft 240 may be formed of a material having a higher strength than that of the upper case 114.

The rotor hub 250 is fixed to the shaft 240 to be rotating together with the shaft 240. Meanwhile, the rotor hub 250 may include a disc-shaped body part 252, a hub part 254 extending upwardly from a central portion of the body part 252 in the axial direction, and a magnet joining part 256 extending downwardly from an edge of the body part 252 in the axial direction.

When the disc D is mounted in the chucking mechanism 260, the body part 252 may have a support member 252a supporting a bottom surface of the disc D mounted thereon.

Meanwhile, the hub part 254 extends upwardly to increase the bonding strength with the shaft 240. Further, the hub part 254 has the shaft 240 inserted thereinto and an outer circumferential surface of the hub part 254 is fixed to the chucking mechanism 260 having the disc D mounted thereon.

Further, the magnet joining part 256 has a driving magnet 256a mounted on an inner circumferential surface thereof, and the driving magnet 256a faces a front end of the stator core 270 around which a coil 272 is wound.

Meanwhile, the driving magnet 256a may have an annular ring shape and may be a permanent magnet generating magnetic force having a predetermined strength by alternately magnetizing a north (N) pole and a south (S) pole thereof in the circumferential direction.

Here, with regard to the rotation driving of the rotor hub 250, when power is supplied to the coil 272 wound around the stator core 270, driving force for rotating the rotor hub 250 may be generated by electromagnetic interaction between the driving magnet 256a and the stator core 270 around with the coil 272 is wound.

Therefore, the rotor hub 250 is rotated. In addition, the shaft 240 fixed with the rotor hub 250 may rotate together with the rotor hub 250 by the rotation of the rotor hub 250.

The chucking mechanism 260 is fixed to the rotor hub 250 and the disc D is stably mounted on the chucking mechanism 260. To this end, the chucking mechanism 260 may include a chucking mechanism body 262, a chuck chip 264, and an elastic member 266.

As described above, the chucking mechanism body 262 is press-fitted in the hub part 254 of the rotor hub 250 and thus, rotating together with the rotor hub 250.

To this end, the chucking mechanism body 262 includes a step part 262a press-fitted to the hub part 254. That is, the hub part 254 is press-fitted to the step part 262a and thus, the chucking mechanism body 262 is mounted on the rotor hub 250.

Meanwhile, the chuck chip 264 is movably mounted in the chucking mechanism body 262 to fix the disc D. That is, the chuck chip 264 elastically supports the disc D in the radial direction by the elastic member 266.

Both ends of the elastic member 266 are supported by the chucking mechanism body 262 and the chuck chip 264 and the elastic member 266 may be configured as a coil spring.

As described above, the stator core 270 is fixed to the outer circumferential surface of the sleeve holder 220 so that the front end thereof may face the driving magnet 256a. Further, the stator core 270 may be disposed inside the rotor hub 250.

The pulling magnet 280 may be mounted on the stator core 270 to face a lower surface of the rotor hub 250. Meanwhile, the pulling magnet 280 serves to reduce the overfloating of the rotor hub 250.

That is, the overfloating of the rotor hub 250 may be reduced by magnetic force of the pulling magnet 280.

Meanwhile, in the present embodiment, the size of the pulling magnet 280 may be reduced. Described in more detail, the shaft 240 is protruded upwardly from the chucking mechanism 260 and therefore, the overfloating of the rotor hub 250 may be prevented by the shaft 240. As compared with the case in which the shaft 240 is not protruded upwardly from the chucking mechanism 260, the overfloating of the rotor hub 250 may be suppressed even when the size of the pulling magnet 280 is reduced.

Further, the present embodiment describes, by way of example, the case in which the pulling magnet 280 is provided, but the pulling magnet 280 may be removed. That is, the pulling magnet 280 may be removed by allowing the shaft 240 to be protruded upwardly from the chucking mechanism 260.

The stopper member 290 may be mounted on the base member 210 to prevent the shaft 240 from overfloating. That is, the stopper member 290 may be seated on the stopper member support part 212 of the base member 210.

Further, when the stopper member 290 is mounted on the stopper member support part 212, an internal diameter portion of the stopper member 290 may be inserted into the insertion groove 242 of the shaft 240. Therefore, when an external impact is applied, the overfloating of the shaft 240 may be reduced by the stopper member 290.

As described above, the shaft 240 is protruded upwardly from the chucking mechanism 260 and thus, the upper case 114 first contacts the shaft 240 even when the upper case 114 is deformed due to an external impact, whereby contact between the upper case 114 and the disc D may be prevented.

In addition, the overfloating of the shaft 240 and the rotor hub 250 may be reduced even in spite of an external impact.

Further, the size of the pulling magnet 280 may be reduced or the pulling magnet 280 may be removed, such that the spindle motor 200 may be thinned.

Hereinafter, an optical disc driving device according to another embodiment of the present invention will be described with reference to the drawings. However, the same components as the foregoing components will be denoted by reference numerals described above and the detailed description thereof will be omitted.

Figure 4:
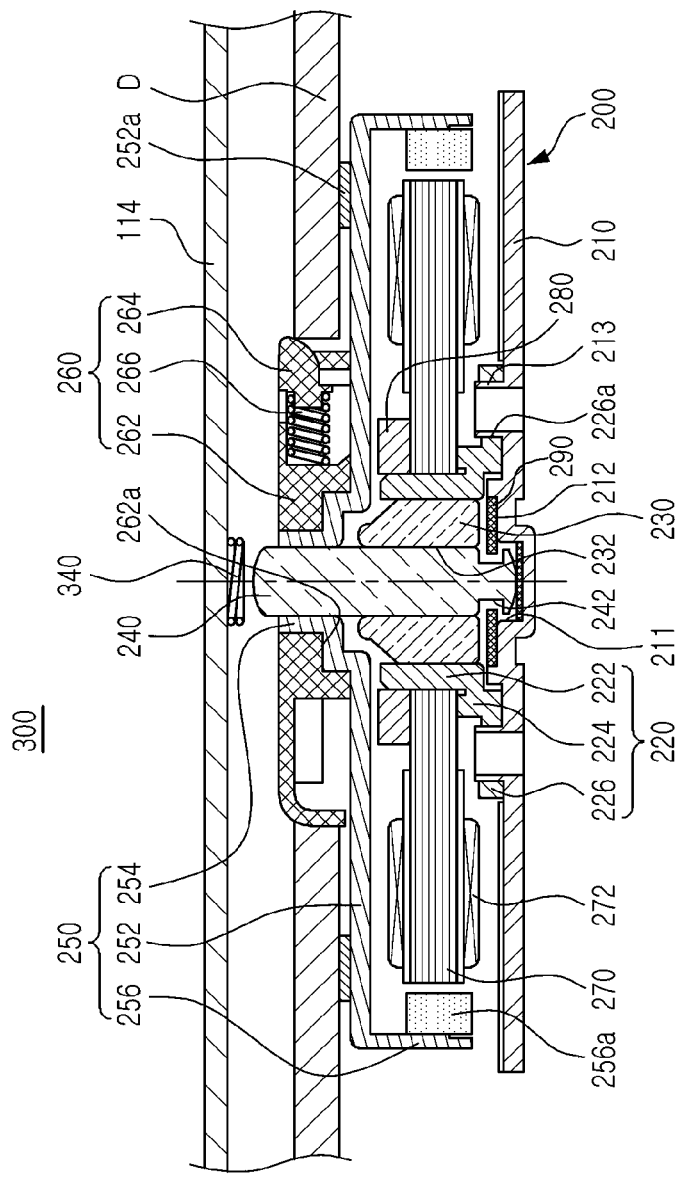
FIG. 4 is an enlarged cross-sectional view illustrating a portion of an optical disc driving device according to another embodiment of the present invention, corresponding to portion A of FIG. 1.

FIG. 4 is an enlarged cross-sectional view illustrating a portion of an optical disc driving device according to another embodiment of the present invention, corresponding to portion A of FIG. 1.

Referring to FIG. 4, an optical disc driving device 300 may further include a spring member 340 mounted on the inside of the upper case 114 to be disposed above the shaft 240.

Further, the spring member 340 may be configured as one of a coil spring and a leaf spring.

Further, the shaft 240 and the spring member 340 may be disposed to have a predetermined distance therebetween.

As described above, since the spring member 340 is disposed above the shaft 240, when the shaft 240 overfloats due to an external impact or the upper case 114 is deformed, the shaft 240 contacts the spring member 340.

Therefore, vibrations generated when the shaft 240 overfloats or when the upper case 114 is deformed may be relieved.

As a result, the vibrations generation may be relieved by the spring member 340 to reduce a signal detection or/and recognition error of the disc D.

Meanwhile, the effect achieved by the optical disc driving device 100 according to the embodiment of the present invention may be achieved by the optical disc driving device 300 according to another embodiment of the present invention. The detailed description thereof will be omitted.

Figure 5:
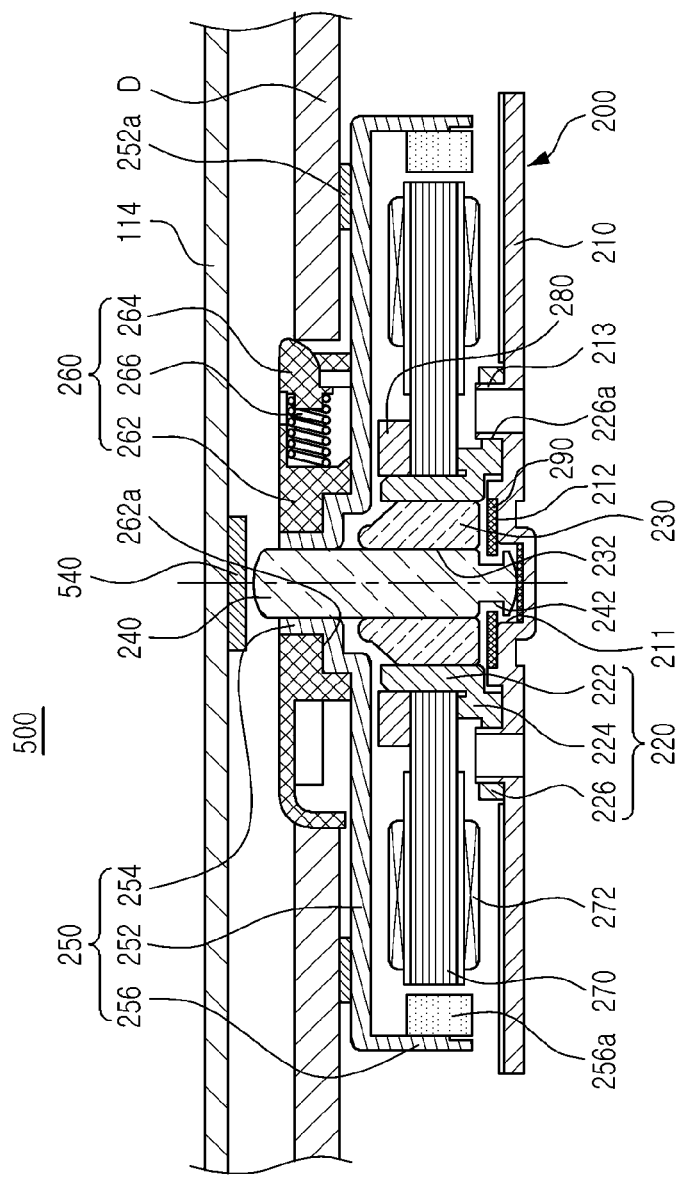
FIG. 5 is an enlarged cross-sectional view illustrating a portion of an optical disc driving device according to another embodiment of the present invention, corresponding to portion A of FIG. 1.

FIG. 5 is an enlarged cross-sectional view illustrating a portion of an optical disc driving device according to another embodiment of the present invention, corresponding to portion A of FIG. 1.

Referring to FIG. 5, an optical disc driving device 500 may further include a plate-shaped damper member 540 that is mounted on the inside of the upper case 114 to be disposed above the shaft 240 and is formed of an elastic material.

Further, the shaft 240 and the damper member 540 may be disposed to have a predetermined distance therebetween.

As described above, since the dampler member 540 is disposed above the shaft 240, when the shaft 240 overfloats due to an external impact or the upper case 114 is deformed, the shaft 240 contacts the damper member 540.

Therefore, vibrations generated when the shaft 240 overfloats or when the upper case 114 is deformed may be relieved.

As set forth above, in an optical disc driving device according to embodiments of the present invention, a shaft is protruded upwardly from a chucking mechanism such that it may support an upper case at the time of an external impact, whereby contact between the upper case and a disc may be prevented.

Therefore, signal detection and disc recognition errors that may caused due to deformation of the disc may be reduced.

Further, the overfloating of a rotor hub is prevented by the shaft, such that the size of a pulling magnet may be reduced or the pulling magnet may be removed, whereby a spindle motor may be thinned.

While the present invention has been shown and described in connection with the embodiments, it will be apparent to those skilled in the art that modifications and variations can be made without departing from the spirit and scope of the invention as defined by the appended claims.

What is claimed is:

1. An optical disc driving device, comprising:
a sleeve holder fixed to a base member;
a sleeve fixed to the sleeve holder;
a shaft rotating while being inserted into the sleeve;
a rotor hub fixed to the shaft and rotating together with the shaft;
a chucking mechanism fixed to the rotor hub and having a disc mounted thereon;
an upper case forming an internal space, together with the base member; and
a spring member mounted on an inside of the upper case to be disposed above the shaft,
wherein the shaft is protruded upwardly from the chucking mechanism.

2. The optical disc driving device of claim 1, wherein the spring member is configured as one of a coil spring and a leaf spring.

3. The optical disc driving device of claim 1, wherein the shaft and the spring member are disposed to have a predetermined distance therebetween.

4. The optical disc driving device of claim 1, further comprising a stopper member mounted on the base member to prevent the shaft from overfloating,
wherein a bottom portion of the shaft is provided with an insertion groove into which the stopper member is inserted.

5. The optical disc driving device of claim 1, wherein the shaft is formed of a material having a higher strength than that of the upper case to prevent the shaft from being deformed when the shaft contacts the upper case due to an external impact.

6. The optical disc driving device of claim 1, further comprising:
a stator core mounted on an outer circumferential surface of the sleeve holder; and
a pulling magnet mounted on the stator core facing the rotor hub.

7. An optical disc driving device, comprising:
a sleeve holder fixed to a base member;
a sleeve fixed to the sleeve holder;
a shaft rotating while being inserted into the sleeve;
a rotor hub fixed to the shaft and rotating together with the shaft;
a chucking mechanism fixed to the rotor hub and having a disc mounted thereon;
an upper case forming an internal space, together with the base member; and
a plate-shaped damper member mounted on an inside of the upper case to be disposed above the shaft and formed of an elastic material,
wherein the shaft is protruded upwardly from the chucking mechanism.

8. An optical disc driving device, comprising:
a sleeve holder fixed to a base member;
a sleeve fixed to the sleeve holder;
a shaft rotating while being inserted into the sleeve;
a rotor hub fixed to the shaft and rotating together with the shaft;
a chucking mechanism fixed to the rotor hub and having a disc mounted thereon;
a stator core mounted on an outer circumferential surface of the sleeve holder to be disposed below the rotor hub;
a pulling magnet mounted on the stator core to face the rotor hub;
a stopper member mounted on the base member to prevent the shaft from overfloating; and
an upper case forming an internal space, together with the base member,
wherein the shaft is protruded upwardly from the chucking mechanism,
a bottom portion of the shaft is provided with an insertion groove into which the stopper member is inserted, and
the upper case has one of a spring member or a damper member on a lower surface thereof, such that the spring member or the damper member is disposed to face the shaft.

* * * * *